A. A. BALL.
LOCK NUT.
APPLICATION FILED JULY 15, 1918.

1,389,927. Patented Sept. 6, 1921.

Inventor
Augustus A. Ball,
By Wright Brown Quimby & May
Attorneys

UNITED STATES PATENT OFFICE.

AUGUSTUS A. BALL, OF LYNN, MASSACHUSETTS.

LOCK-NUT.

1,389,927. Specification of Letters Patent. Patented Sept. 6, 1921.

Application filed July 15, 1918. Serial No. 244,870.

*To all whom it may concern:*

Be it known that I, AUGUSTUS A. BALL, a citizen of the United States, residing at Lynn, in the county of Essex and State of Massachusetts, have invented new and useful Improvements in Lock-Nuts, of which the following is a specification.

This invention relates to a nut adapted to be locked to a bolt having a longitudinal slot interrupting the continuity of its thread, and is embodied in the improvements hereinafter described and claimed relating both to the nut and to the bolt.

Of the accompanying drawings forming a part of this specification,—

The same reference characters indicate the same parts in all of the figures.

A nut 12 embodying my invention is preferably of ductile metal and of castellated form, and suitably tapped, one end of the nut being provided with a plurality of integral fingers or extensions 13 separated by slots 14.

Figure 3:
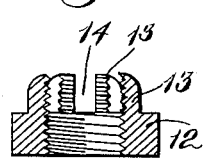
Fig. 3 is a section on line 3—3 of Fig. 1.
Figure 12:
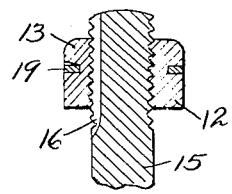
Fig. 12 is a sectional view showing a nut having features illustrated in Figs. 8 and 10.

Said extensions are preferably substantially parallel with the axis of the nut, and the inner face of each extension preferably has segments of the nut thread, as shown by Fig. 3, so that the threaded bore of the nut extends from the inner side or end of the nut to the outer ends of the extensions 13, the continuity of the threads in a portion of the bore being interrupted by the slots 14.

Figure 4:
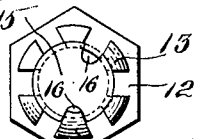
Fig. 4 is an end view of the nut engaged with a bolt.
Figure 6:
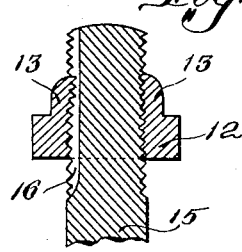
Fig. 6 is a section on line 6—6 of Fig. 4.

A bolt 15 adapted for use with the above described nut has a longitudinal slot 16 interrupting the continuity of its thread, the form of the slot 16 and of each of the extensions 13 being such that when an extension registers with the slot, the extension is adapted to be distorted, so that a portion of it enters the slot, as shown by Figs. 4 and 6, and thus locks the nut to the bolt. The screw thread segments on the extensions 13, enable an extension to be engaged with a slot 16 by a very slight inward movement, or in other words, by an inward movement of less amplitude than would be required if the thread segments were not present. In the embodiment of the invention shown by Figs. 1 to 6, inclusive, the extensions are thinner than the thickness of the nut between its bore and margin, and each is adapted to be distorted or bent inwardly without difficulty.

To enable the nut to be locked at practically the exact adjustment desired, I provide a plurality of slots 16 and so space the slots relatively to the spacing of the extensions 13, that when an extension registers with a slot, another extension is in close proximity to, but not in registration with another slot, so that in case no extension registers with a slot when the nut has been forwardly rotated until it is practically seated on its bearing, a very slight additional forward rotation will bring an extension into registering position and permit the locking of the nut.

Figure 7:
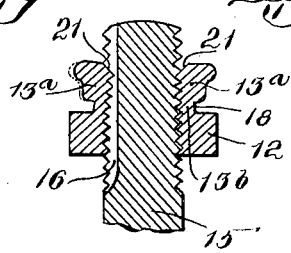
Figs. 7 and 8 are views similar to Fig. 6, showing certain variations from the structure shown by the preceding figures.
Figure 5:
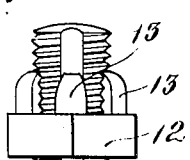
Fig. 5 is a side view of the same.
Figure 8:
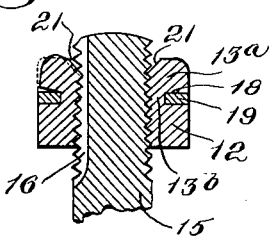
Figure 9:
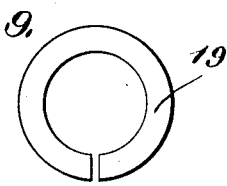
Fig. 9 is a plan view of the ring shown in section by Fig. 8.

Figs. 7 and 8 show the nut provided with fingers or extensions, each comprising a relatively thick outer portion 13$^a$ and a relatively thin inner portion or neck 13$^b$ adapted to be bent or distorted without difficulty, to permit the inward displacement of the outer portion into engagement with the slot 16, the said outer portion being moved from the position indicated by dotted lines to that indicated by full lines. The reduction of the fingers to form the necks 13$^b$ may be effected by forming grooves 18 in the outer sides of the extensions. Said grooves may receive a filler 19 (Figs. 8 and 9), adapted to form a seat for the outer portions 13$^a$ and prevent the outward bending of the necks 13$^b$ and the outward displacement of the portions 13$^a$, so that the extensions which are not inwardly displaced to lock the nut, constitute an inexpansible prolongation of the nut, increasing its effective engagement with the bolt. The filler 19 may be a split ring (Fig. 9), forced or sprung into the grooves 18.

The outer ends of the displaceable extensions may be formed to be engaged by any suitable tool, whereby an inwardly displaced extension may be forced outwardly to its normal position to unlock the nut. To this end the extensions may be provided at their outer ends with faces 21 which are preferably inclined from the outer ends of the extensions toward the axis of the nut, as shown by Figs. 7 and 8, so that any suitably shaped tool forced into a slot 16, against the face 21 of an inwardly displaced extension will force said extension outwardly until the nut is unlocked.

Figure 10:
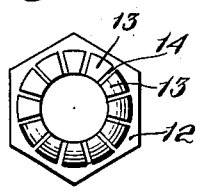
Fig. 10 is an end view of a nut having a relatively large number of the fingers or extensions hereinafter described.

As shown by Fig. 10, a relatively large number of extensions 13 may be provided by making the slots 14 relatively narrow.

Figure 11:
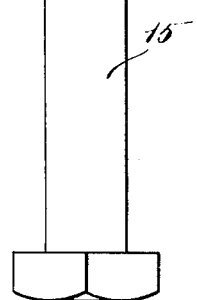
Fig. 11 is a view similar to Fig. 6, showing a modification.
Figure 11:
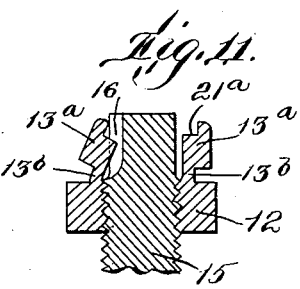

Fig. 11 shows a modification in which the slot 16 is formed in a reduced end portion of the bolt and does not interrupt the continuity of the thread. In this case the extensions 13 may have smooth inner faces if desired.

Fig. 11 also shows the outer ends of the extensions provided with angular recesses 21ª adapted to be engaged by an unlocking tool.

The grooves formed in the base portions of the nut-extensions facilitate the inward bending of the extensions by bending force applied to their outer ends. Said grooves when formed in the outer surfaces of the extensions as shown by Figs. 7, 8 and 11, require bending force to be applied to the outer end portions of the extensions, an instrument for exerting said force being applicable only to the portions of the extensions between the grooves and the outer ends, so that the force is advantageously exerted. When the extensions are closely spaced as shown by Fig. 10, they are separated by slots which are narrower than the width of the extensions, and said slots and extensions are so proportioned that an inwardly bent extension is laterally supported by the two adjacent unbent extensions, so that turning force exerted on the nut is resisted by three extensions, viz., the inwardly bent extension and the two unbent extensions at opposite sides thereof. Each slot 16 is provided with radial sides and with a rounded bottom merging into said sides, said bottom forming a recess between the inner side of a bent extension and the center of the bolt as best shown at the lower portion of Fig. 4. Said recess is adapted to receive a tool employed to force a bent extension out of a slot 16.

Figure 1:
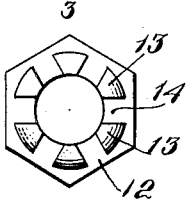
Figure 1 is an end view of a nut embodying the invention.
Figure 2:
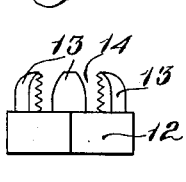
Fig. 2 is a side view thereof.

The bolt slots 16 are so arranged that neither slot is diametrically opposite another slot, this arrangement being shown by Fig. 4. The slots are therefore separated at one side of the bolt by a relatively narrow peripheral portion of the bolt, and the opposite side by a wider peripheral portion. In other words, the slots are more closely spaced apart at one side of the bolt than at the opposite side. The nut-extensions are uniformly spaced apart as shown by Figs. 1, 4 and 10, the arrangement being such that when either extension registers with one of the slots, another extension is in position to be brought into registration with another slot by a turning movement of the nut of less amplitude than the distance between two adjacent extensions. The result of this arrangement is that when the nut begins to bottom on a supporting surface, a turning movement of relatively small amplitude is sufficient to insure the registration of a nut extension with a bolt slot, when the nut is fully turned home. The slots are all preferably formed substantially at one side of the center of the bolt, as shown, by Fig. 4. This arrangement of the slots is important in case one side of the bolt is obstructed by a part of the structure of which the bolt forms a part, because it enables the bolt to be turned to cause the slots to face outwardly from an obstruction at one side of the bolt, so that each slot is accessible and arranged to receive a nut extension.

As implied in the foregoing description and in the following claims, I am not limited to the specific construction of either embodiment of the invention shown by the drawings, except as otherwise required in certain of the more limited claims.

I claim:

1. A lock nut having a plurality of extensions each connected with the body of the nut by a reduced section formed by an exterior groove adjacent the base and extending throughout the width of each extension and continuously about the nut, whereby bending of the extensions is facilitated.

2. A lock nut having a plurality of extensions, each adapted to be bent inwardly into interlocking engagement with a slotted bolt, the extensions being separated by slots which are narrower than the width of the extensions, said slots and extensions being so proportioned that an inwardly bent extension is laterally supported by the two adjacent unbent extensions.

3. A nut having a plurality of inwardly displaceable extensions provided with external grooves at their inner portions, and a filler occupying said grooves.

In testimony whereof I have affixed my signature.

AUGUSTUS A. BALL.